United States Patent Office 2,919,342
Patented Dec. 29, 1959

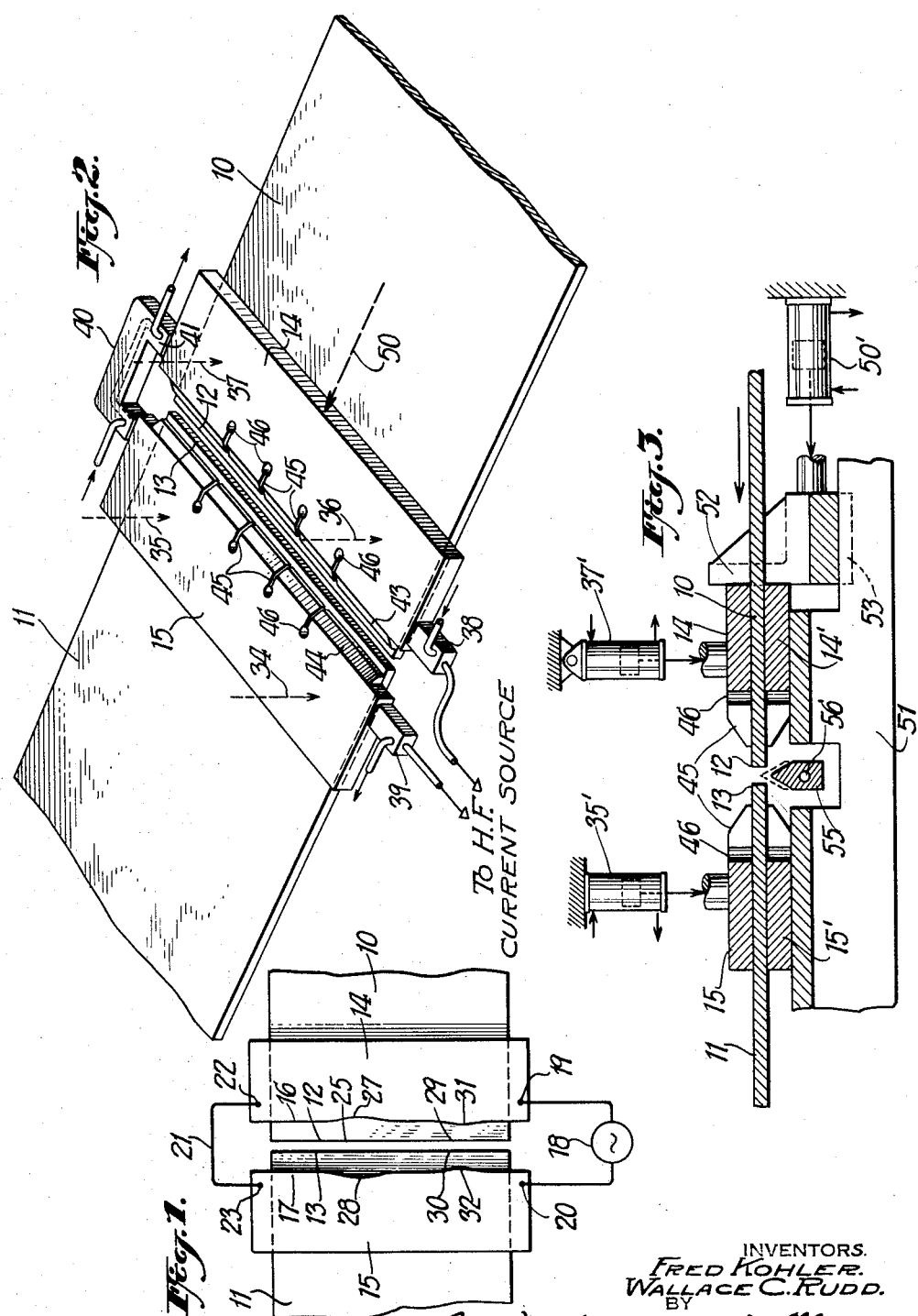

2,919,342

WELDING OF STRIP ENDS AND THE LIKE

Fred Kohler, New York, and Walter C. Rudd, Larchmont, N.Y., assignors to Magnetic Heating Corp., New Rochelle, N.Y., a corporation of New York Application March 20, 1958, Serial No. 722,767

13 Claims. (Cl. 219—104)

This invention relates to methods and apparatus for welding metal portions together by resistance heating through the use of high frequency electrical currents conducted to and along the metal surfaces which are to be welded. Among other possible uses, the invention is particularly well adapted for the butt welding or lap welding of the ends or edges together on opposed pieces of sheet steel or on opposed ends of pieces of metal strips.

Many years ago, Edward Bennett, as disclosed in his U.S. Patent No. 2,066,668, proposed to heat to welding temperature the spaced-apart edges of two sheet metal pieces, by connecting a source of high frequency current to flow along the edge of the first piece to the remote end of such edge, thence over to the remote end of the edge of the other piece and back along the edge of such other piece to the source. He assumed that the high frequency currents flowing in opposite directions respectively on the two closely spaced edges, would by mutual induction, be caused to be concentrated on the edge surfaces to heat same to proper welding temperature, whereupon the current was to be cut off and the heated edges forced together. As a variation of such method, he proposed that currents be connected to flow in the same direction along the two spaced-apart edges and caused to be concentrated at such edges by a conductor interposed therebetween and on which current flows in the opposite direction. However, these methods, so far as is known, have never been found to have any commerical or practical utility and were in fact by tests found to be practically inoperative in the usual case, for the following reasons. While the well known skin effect with high frequency current tends to concentrate the flow of current along the edges to be welded, yet it did not, with the benefit of the Bennett proposals, do so with a satisfactory degree of uniformity. Instead, while toward the ends of the edges to be welded, the current would heat the edges to welding temperature, yet along intermediate portions of the edges, the current flow would not be sufficiently concentrated at the edges to heat same to welding temperature, until after the end portions of the edges were overheated. Of if the midportions of the edges were heated to proper welding temperature, then the end portions of the edges on which the current was more concentrated, by that time would be overheated and become too soft for making a good weld, particularly if the edges are of any substantial length. But tests have shown that the same troublesome difficulty exists even if the edges to be welded are no longer than an inch or two. A further difficulty arose from the fact that the heating of the edges to welding temperature, and particularly the non-uniform heating as just explained, caused prohibitive warping of the edge portions, so that when forged together, the welded areas would be wavy and embody prohibitive humps and valleys. Also, in the above-mentioned patent, the highest frequency taught was 30,000 cycles per second, and at that frequency the mutual inductance between the spaced-apart edges carrying the heating current does not cause such concentration of current in the heated edges as to either efficiently heat the very edge surfaces to be welded, or to do so without heating and softening the metal in back of the edges to a degree causing warping and interference with the desirable firm "backing" of the metal when forced together at the welded seam.

In accordance with the present invention, it has been found that the above-noted difficulties may be wholly overcome in the following way. Elements in the form of bars or plates, preferably rigid and of good conductive material, such as aluminum or copper, are placed along in contact with the spaced-apart edges of the members to be welded, these elements respectively being positioned so as to be spaced slightly back away from the edges to be heated. Then high frequency current, preferably of the order of 100,000 cycles per second or higher, is connected from the source of such current to the end of one of said elements to flow along same to its remote end. Thence the current is conducted to the remote end of the other element to flow along same back to a connection to the source. The current in these elements or plates (the opposed edges of which are relative close to each other, although preferably not as close as the opposed spaced edges of the metal to be welded) tends by reason of mutual inductance to travel to the edges of the plates and portions of the current also travelling to the edges of the metal strips or the like which are to be welded together. With this method and arrangement, for some reason or reasons not now fully understood, the current is concentrated along on the edges to be welded with a sufficient degree of uniformity to cause generally uniform heating of the edge surfaces, so that when the current is shut off and the edges then forced together, a satisfactory weld is obtained, even though the weld may be a relatively long one. But for ideal results according to a further important aspect of the invention, the edges of the rigid metal plates should be so shaped or interrupted at various points, that the impedance to the high frequency current flowing therein, will be modified from place to place, and so as to cause less heating at local areas where there may tend to be hot spots, and more heating where there is a tendency for the edges to be relatively too cool.

In the manner above summarized, in accordance with the invention, it is possible to weld edges of sheet steel, for example, or abutting edges of metal strips and the like, and to secure a weld of an excellence beyond what it has been possible to accomplish in any other way. And the heating to welding temperature may be so effectively and uniformly concentrated on the very edge surfaces to be welded, that such surfaces are softened to welding temperature only to a depth of several thousandths of an inch, with the result that the crystalline structure of the metal is believed to be left substantially intact to a degree such that in a cross-section of a welded seam, it is difficult to determine the location of the weld. The warping difficulties above referred to are eliminated, apparently because of the closely limited region of heating along the line of the welded seam, and because of the effect of the conductor elements or plates, which securely clamp the metal members to be welded close to the line of the weld.

The invention is well adapted for butt welding securely and smoothly together, the ends of steel strips as in the pickling lines in steel mills, rolling mill lines, or when making continuous strip to be formed into tubing. The edges of areas of sheet steel may also be welded together efficiently and smoothly by use of the invention. It is contemplated also that the invention be used for welding metals other than iron or steel, for example aluminum or high conductivity copper which cannot successfully be heated by induction heating methods for welding. Also as herein explained the invention may be of unique value in welding together metal members formed of different metals requiring different heating temperatures.

Various further and more specific objects, features and advantages of the invention will appear from the description given below, taken in connection with the accompanying drawings, illustrating by way of example preferred forms of the invention.

In the drawings:

Fig. 1 is a somewhat schematic diagram comprising a plan view illustrating arrangements for carrying out the principles of the invention;

Fig. 2 is a perspective view showing further features of a desirable embodiment of the apparatus for practicing the invention; and Fig. 3 is a vertical sectional view illustrating the preferred arrangements of the principal parts of the apparatus for carrying out a preferred embodiment of the invention.

Referring now to the drawings in further detail, in Fig. 1, two strips are indicated as at 10 and 11, which, for example, may comprise relatively wide and thin sheet steel, the end edges as at 12 and 13 of which are here shown in closely spaced relation, these being the edges which are to be welded together. A pair of conductive plates or bars are indicated at 14 and 15 respectively, these being formed of some good conductive material, such as aluminum or copper or other material preferably having a conductivity higher than that of the metal parts to be welded, and being preferably relatively rigid and suitably mounted to contact with and apply pressure to the strips 10 and 11 for holding same firmly down on a supporting surface, which may comprise an insulation support, or, if desired, another pair of the rigid elements the same as at 14 and 15, but located beneath the strips 10 and 11. The facing edges as at 16 and 17 of the rigid members 14 and 15, although positioned to extend along in rather closely spaced relation, are, as shown, each spaced back somewhat from the edges 12 and 13 which are to be welded together. The spacing of the edges 16 and 17 and even of the edges 12 and 13 is shown possibly of somewhat exaggerated magnitude for the usual case and in the interests here of clearness. The edges 16 and 17 respectively should be placed back far enough from the edges 12 and 13 so as not to contact with portions of the latter, which are likely to become heated to a softening temperature.

A source of high frequency current is indicated at 18 having its terminals suitably connected as at 19 and 20 to the rigid members 14, 15 respectively and the remote ends of these members are interconnected by conductor 21, the terminals of which suitably contact as at 22, 23 with members 14 and 15. Thus a circuit extends from the high frequency source along one of the rigid members 14 to its remote end, then over to the remote end of the other rigid member 15, back to the other terminal of the source. Due to the fairly close proximity of the edges 16, 17, this high frequency current, or so much of it as flows in the rigid members 14 and 15 (in lieu of passing into members 10 and 11) will tend to flow along at or close to the edges 16 and 17. But since the members 14 and 15 are in contact with, and preferably under pressure against, the members 10 and 11, considerable portions of the current will be transferred to the members 10 and 11, and, because of the proximity of the edges 12 and 13, such current will be closely concentrated at said edges.

In some cases, satisfactory results may be obtained with the arrangement as shown in Fig. 1 and as thus far described, and assuming that the edges 16 and 17 are straight and uniformly spaced apart. Of course, because of the proximity effect, such of the current as flows into the members 10 and 11 to be welded, tends to be highly concentrated along on the edge surfaces at 12 and 13, but for some reason or combination of reasons not fully understood, the current along on these edges will be sufficiently uniform in some cases to permit of a satisfactory weld by pushing the edges together after heating and after the current is shut off, whereas in the absence of the conductor members 14 and 15 during the heating, that will not be the case.

However, in some cases, with the arrangement as shown in Fig. 1 but with the edges 16 and 17 straight and uniformly spaced, there will still a tendency for portions of the edges 12 and 13 to become overheated, while other portions are still too cool for a uniform weld. When this difficulty occurs, it may be readily overcome by a further important aspect of the invention, and to a surprisingly effective degree. That is, if for example portions of the edges 12 and 13 which are located near the point indicated by the numeral 25 should tend to remain too cool after other portions come up to welding temperature, this effect, it has been found, can be overcome by forming recesses as at 27 and 28 in the edges of the rigid members 14 and 15. On the other hand, if portions of the edges to be welded as at 29, 30, for example, should become too hot before other portions have been heated to welding temperature, then this difficulty may be overcome by forming the edges 16 and 17 with protrusions as at 31, 32. The recesses at portions 27, 28 tend to increase the impedance to the high frequency current flowing along elements 14, 15 past such recesses and presumably tend to cause the current flow in such elements to follow paths somewhat more remote from the edge portions 25 and 26 that at other places, and it might naturally be expected that for this reason, the concentration of current along edge portions 25, 26 would be reduced, thereby causing these portions to be even less heated when greater heating thereof is desired. Also at the protruding areas 31, 32, the current flowing in the rigid members 14 and 15 tends to be brought closer to the edge portions 29 and 30, whereby one would perhaps normally expect slightly more current to be brought into the latter portions and heat same further when they are already overheated. But since the recessed portions 27 and 28 present greater impedance to the current flow in elements 14, 15, this apparently causes a greater portion of the current to then flow down into the members 10 and 11 at these regions and thus tends to increase the heating at edge portions 25 and 26, which is just what is necessary to overcome a cause of failure with the above-mentioned Bennett methods. And although it might be expected that the protruding portions 31 and 32 could cause portions 29 and 30 to be heated to a greater degree when it is desired to heat them less, nevertheless it appears that any effect of this nature is in some manner overcome by the offsetting effect that the impedance at regions 31, 32 in elements 14, 15 is decreased, whereby less current here flows into edge portions 29, 30 and thus overheating thereof is avoided.

In order most effectively to carry out the invention, the shape and contours of the edge portions of the conductive members 14 and 15 are preferably determined by trial in the following way. Assuming that members 10 and 11 to be welded together, are selected of a given metal such as steel, and that they are of a certain width and thickness, and the members 14 and 15 are also of predetermined dimensions, then the arrangement is set up as shown in Fig. 1, but starting with the edges 16 and 17 of straight form for example. Then, upon testing this arrangement with the high frequency current applied, if it is found that certain regions along the edges 12 and 13 to be welded remain too cool after other portions become overheated, then the edge portions of members 14, 15 adjacent such cooler region are cut back, interrupted or recessed to an extent such that the underheating is avoided. On the other hand, if portions as at 29 and 30, for example, tend to be overheated or do not reach welding temperature as soon as other portions, then the adjacent edge portions as at 31, 32 on members 14, 15 may be extended as shown to decrease the impedance to currents flowing therealong close to the region of portions 29 and 30, and the overheating is there avoided.

Further details of a preferred embodiment of the invention are shown in Fig. 2, where the same reference numerals are used to identify parts corresponding to those shown in Fig. 1. Here the conductor member 15, for example, may normally be pressed down in stationary position against strip 11 as by forces applied at the points indicated by the arrows 34, 35, for example, such as by power cylinders as indicated in Fig. 3 (hereinafter described). The rigid member 14 may similarly be pressed down against strip 10 by forces applied in directions indicated by the arrows 36 and 37. The current is applied respectively to the members 14 and 15 as by contacts 38, 39, connected to the high frequency source, the contact 38, at least, preferably slidably engaging the end of the rigid member 14. These contacts, as is usual with high frequency apparatus, preferably are formed with cooling fluid cavities as indicated. The members 14, 15 similarly should be cooled if used frequently. The remote ends of the members 14 and 15 are interconnected by a U-shaped contact member 40 also preferably fluid-cooled and the portion 41 thereof, at least, being arranged slidably to engage the member 14. In the form shown in Fig. 2, the forward or opposed edges of the members 14 and 15 are preferably bevelled as at 43, 44, so that the current flowing therein will be brought down close to the edges 12, 13 of the members 10, 11 which are to be welded.

With the preferred form shown in Fig. 2, the impedance along on the edges of the rigid members 14 and 15 is modified by cutting narrow slots or slits as at 45 extending for example at right angles to, and back from the edges, and terminating in circular apertures as at 46. It is understood that the particular shape, number and position of these interruptions of the edges 14 and 15, as shown in Fig. 2, is merely illustrative, and that the number, position and depth thereof, should be determined best by trial in the manner above explained in connection with Fig. 1 for each installation, and to give the best results with the welding of strips or sheets of various kinds and dimensions. But it will be understood that by reason of the proximity effect, the high frequency current will tend to flow along close to the forward portions of edges 43, 44 and thence into and along the edges 12 and 13 to be welded. However, the impedance to the current in edges 43, 44 will be greatly increased at the slits 45 and thus it is believed that this will cause greater portions of the current to transfer from the edges 43, 44 into the metal of the members 10 and 11 and onto the edges 12 and 13 thereof, thus tending to increase the heating effect on the edges 12 and 13 at points adjacent such slits. In this way, the mid-portions of the edges 12 and 13, which, if heated only according to the teachings of the Bennett patent above referred to, would tend to remain too cool, may, by reason of the presence of the rigid members 14, 15 and the edge formations thereof, be caused to be brought up to welding temperature as quickly as the portions of the edges 12 and 13 nearer the contacts 38, 39 or 40.

In operating the arrangement of Fig. 2 in practice, there will usually be provided other rigid members beneath the strips 10 and 11 and along each side of the line of the desired weld, and with current connections the same as shown for the members 14 and 15 in Fig. 2. That is, in the usual case, the equipment shown in Fig. 2 will be duplicated on the underside of the strips 10 and 11, although if the strips are of relatively thin metal, that may not be necessary.

In operating the arrangement of Fig. 2, the current (preferably of a frequency of the order of 100,000 cycles per second or higher) is applied to the contacts 38 and 39 and with a spacing between the edges 12 and 13 for example of from one-sixteenth to one-eighth of an inch, or possibly up to one-quarter inch. Then, just as soon as the edge surfaces 12 and 13 are brought to welding temperature, as may be noted by their degree of incandescence, the current is disconnected and the assembly comprising the rigid conductor member 14, together with the strip member 10, may be thrust to the left as by a force applied as indicated by the arrow 50, for example, through the use of a power cylinder as referred to later in connection with Fig. 3. Thus the edges 12 and 13 are brought together firmly under pressure and will become welded together with an excellent weld, as above described.

In the vertical cross-sectional view shown in Fig. 3, rigid conductor members as at 14, 15 are provided above the members to be welded 10 and 11, and similar rigid conductor members 14' and 15' are placed below the members to be welded, the whole arrangement being supported as by a suitable insulated or insulation supporting structure 51. Power cylinders as at 35', 37' are indicated for pressing the assemblies 15, 11, 15' and 14, 10, 14' respectively into clamping condition with respect to the members 10 and 11. Suitable insulation connecting and supporting means as at 52 can be provided for the assembly 14, 10, 14' and slidably mounted as at 53 and connected to a power cylinder as at 50' for sliding same to bring the edges 12 and 13 under pressure together after the current is shut off.

As above mentioned, it is preferable that the high frequency used be of the order of about 100,000 cycles per second or higher, for example, up to 450,000 or even higher. This is for the reason that the depth to which the current will penetrate at the edges, such as at 12, 13, to be heated, varies according to an inverse square root law. The curve showing such depth at increasing frequencies, reveals that, as the frequency increases up to about 10,000 cycles and somewhat higher, the depth of penetration rather slowly or gradually decreases, but as the frequency increases from above 50,000 up to the neighborhood of 100,000 cycles, the curve shows a comparatively sharp decrease of penetration. In other words, as the frequency approaches a range up to about 100,000 cycles, the current quite abruptly becomes more concentrated in the very edge surfaces, so that the heating and softening to welding temperature may be confined to a fraction of a thousandth of an inch of depth. This leaves the metal at greater depths still rigid, enabling the softened surface to be forced firmly under pressure into welded condition and at the same time increasing the efficiency of the heating operation tremendously. For example, when a frequency of about 10,000 cycles was used, but with other factors in accordance with the invention, a satisfactory weld was not obtained and the depth of penetration of the current was some three or more times greater than with a frequency of about 100,000 cycles, and what is perhaps more serious with such lower frequencies the impedances of the paths through the members 14 and 15 become too close to those of the paths along on the edges being welded, for the method to operate satisfactorily.

When it is desired to butt weld together metal elements formed of different metals, for example when it is desired to weld a member of a metal which fuses relatively easily to a portion of another element which welds properly only at a substantially higher temperature, this has heretofore generally presented a very difficult problem, not possible satisfactorily to solve with methods of high frequency induction heating or with the various methods of arc welding in the usual cases. However, with the present invention, one of the elements, for example element 10, to be welded, may be of a metal different from the other element 11 and such as to require a substantially higher welding temperature at its edge than does the element 11, and with the present invention, such temperature differential may readily be accomplished by forming the edges of the plates 14 and 15 respectively with different contours or so as to be spaced differently from the edges to be welded and to obtain the required temperature differential. For example, if the edge of element 10 is to be heated to a higher temperature, then the edge 43 on plate 14 may be formed with a greater number of slits or interruptions than the edge 44 of member 15 and with the number and placing of the slits determined by trial so that both edges which are to be welded together will be heated each uniformly but each to its required welding temperature different from the other. By using similar expedients, one of the elements as at 10 may, for example, be thicker than the other element 11, thus requiring more heat within a given time to bring its edge to the required temperature and this also can be accomplished by adjustment of the shape or number or placing of the interruptions in the edges of the plate members 14 and 15.

As shown in Fig. 3, a member of high conductivity such as copper, as indicated at 55, may be suitably mounted to extend along close to the gap between the edges 12 and 13 to be heated. In the form here shown, this member is of wedge shape (although not necessarily so) and positioned beneath this gap or in a position to extend somewhat up into the gap if desired temporarily, and as indicated by dotted lines. This member further may be formed with a cavity for fluid cooling as at 56. The effect of such a non-ferrous member of high conductivity in or at such a gap during the high frequency resistance heating period, will be to reduce the impedance to the current flowing along the portions of the gap edges nearest member 55, thus tending to further aid, if desirable, in the concentration of the high frequency current closely on the very surfaces of such edges or on the lower, or, if preferred, the upper corner of such edges (if member 55 is placed nearest the upper corner), in case it is desired to soften the latter corner slightly more or quicker than the other, to control the direction of any bulge at the weld. However, in many cases, the use of such a conductor is unnecessary.

The invention of this application comprises an improvement upon the invention disclosed in the application of Wallace C. Rudd filed concurrently herewith, Serial No. 722,788, entitled "Welding of Strips." As described in that application, the application of the heating current may be controlled by a time-control switch, and the operations of the power cylinders also may be controlled by suitable known timing apparatus. As further explained in that application, the arrangement disclosed therein, as well as the above-described arrangement, may be used for forming a lapped weld as well as for butt welding.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding an elongated edge of one metal portion to an elongated edge of another metal portion, which comprises: positioning said portions respectively with their said edges extending along each other in close but spaced relation; causing heating current from a source of a frequency of about 50,000 cycles per second or higher to be conducted onto the elongated edge of the first of said portions to flow therealong; thence conducting such current flow to the other of said elongated edges to flow back therealong and to the source, such conduction of the current onto said portions being accomplished through the medium of conductive elements extending along in contact with said portions respectively, said elements being positioned with edges respectively close to said edges of said portions, the path for said current extending from one end of the first of said elements partially along on such element and partially along on the edge of the metal portion which it contacts, to the other end of said first element, thence over to the adjacent end of the other element and partially along on said other element and partially along on the edge of the metal portion which it contacts, and back to the source, thereby to cause said edges of the metal portions to be heated substantially concurrently to welding temperature; and then bringing the thus heated edges into contact under pressure for welding same together.

2. Method for welding an elongated edge of a ferrous metal portion to an elongated edge of another ferrous metal portion, which comprises: positioning said portions respectively with their said edges extending along each other in close but spaced relation; causing heating current from a high frequency source to be conducted onto the elongated edge of the first of said portions to flow therealong; thence conducting such current flow to the other of said elongated edges to flow back therealong and to the source, such conduction of the current onto said portions being accomplished through the medium of conductive elements having a substantially higher conductivity than said ferrous metal portions and extending along in contact with said portions respectively, said elements being positioned with edges respectively close to said edges of said portions, the path for said current extending from one end of the first of said elements partially along on such element and partially along on the edge of the metal portion which it contacts, to the other end of said first element, thence over to the adjacent end of the other element and partially along on said other element and partially along on the edge of the metal portion which it contacts, and back to the source, thereby to cause said edges of the metal portions to be heated substantially concurrently to welding temperature; and then bringing the thus heated edges into contact under pressure for welding same together.

3. Method for welding an elongated edge of one metal portion to an elongated edge of a different metal portion requiring a greater amount of heat to bring its edge up to welding temperature, which method comprises: positioning said portions respectively with their said edges extending along each other in close but spaced relation; causing heating current from a high frequency source to be conducted onto the elongated edge of the first of said portions to flow therealong; thence conducting such current flow to the other of said elongated edges to flow back therealong and to the source, such conduction of the current onto said portions being accomplished through the medium of conductive elements of high electrical conductivity extending along in contact with said portions respectively, said elements being positioned with edges respectively close to said edges of said portions, the path of said current extending from one end of the first of said elements partially along on such element and partially along on the edge of the first metal portion which it contacts, to the other end of said first element, thence over to the adjacent end of the other element and partially along on said other element and partially along on the edge of the different metal portion which it contacts and back to the source, said other element having an impedance at said high frequency sufficient to cause such a greater portion of said current to flow along on the edge of said different metal portion than flows along on the edge of the first metal portion, as to cause said edges of the metal portions to be heated substantially concurrently to welding temperature; and then bringing the thus-heated edges into contact under pressure for welding same together.

4. Method in accordance with the foregoing claim 1 and in which such conductive elements are placed as specified along in contact respectively with said metal portions and on both of the opposite surfaces of said portions.

5. Method for welding an elongated edge of one metal portion to an elongated edge of another metal portion, which comprises: positioning said portions respectively with said edges extending along each other in closely-spaced relation; causing heating current from a source thereof of a frequency of the order of 100,000 cycles per second or higher to be conducted onto the elongated edge of the first of said portions to flow therealong; thence conducing such current over to the other of said elongated edges and back therealong and to the source; controlling the degree of concentration of the current flow at various points along on said edges by conducting the current thereto through conductive elements extending along in contact with said portions at positions respectively close to the edges thereof and with parts of said conductive elements formed and positioned to present greater impedance to the flow of said current therein at regions along said edges where it is desired to increase the degree of current concentration in the edges as compared with the degree of concentration which would otherwise occur at such regions; and after said edges are heated to welding temperature, bringing same into contact under pressure for welding same together.

6. Method for welding an elongated edge of one metal portion to an elongated edge of another metal portion, which comprises: positioning said portions respectively with said edges extending along each other in closely-spaced relation; causing heating current from a source thereof of a frequency of about 50,000 cycles per second or higher to be conducted onto the elongated edge of the first of said portions to flow therealong; thence conducting such current over to the other of said elongated edges and back therealong and to the source; controlling the degree of concentration of the current flow at various points along on said edges by conducting the current thereto through conductive elements extending along in contact with said portions at positions respectively close to the edges thereof and with parts of said conductive elements located closer to or further away from said edges respectively for decreasing or increasing the degree of concentration of the current flow in the edges adjacent said parts, as compared with the degree of such concentration which would otherwise occur adjacent said parts; and after said edges are heated to welding temperature, bringing same into contact under pressure for welding same together.

7. Heating apparatus for use in welding an elongated edge of one metal portion to an elongated edge of another metal portion comprising in combination: means for clamping said portions respectively in positions with their said edges extending along each other in closely-spaced relation; means for conducting heating current from a high frequency source to flow along one of said edges and thence back along the other, said conducting means including conductive elements respectively positioned in contact with said portions and extending along close to the edges thereof, said elements being formed to present greater impedance to the flow of said current therethrough at portions thereof adjacent the mid-portions of said edges, thereby causing a greater degree of concentration of the current flowing in the mid-portions of said edges than would otherwise occur.

8. Heating apparatus for use in welding an elongated edge of one metal portion to an elongated edge of another metal portion comprising in combination: means for clamping said portions respectively in positions with their said edges extending along each other in closely-spaced relation; means for conducting heating current from a high frequency source to flow along one of said edges and thence back along the other, said conducting means including conductive elements respectively positioned in contact with said portions and extending along close to the edges thereof, parts of said elements being spaced further from said edges than other parts at locations where it is desired to increase the degree of concentration of said current flowing in said edges as compared with the degree of such concentration which would otherwise occur at said locations.

9. Heating apparatus for use in welding an elongated edge of one metal portion to an elongated edge of another metal portion comprising in combination: means for clamping said portions respectively in positions with their said edges extending along each other in closely-spaced relation; means for conducting heating current from a high frequency source to flow along one of said edges and thence back along the other, said conducting means including conductive elements respectively positioned in contact with said portions and extending along close to the edges thereof, parts of said elements being slitted to increase the impedance of such parts to the flow of said current therethrough at regions where it is desired to increase the degree of concentration of the flow of said current along said edges as compared to the degree of concentration which would there otherwise occur.

10. Apparatus in accordance with the foregoing claim 9 and in which said elements are slitted by being formed with a plurality of spaced slits extending back into the elements from the edges thereof nearest said edges of the portions to be welded, said slits being located at regions along the mid-portions of the edges which are to be welded.

11. Apparatus in accordance with the foregoing claim 9 and in which said elements are slitted by being formed with a plurality of spaced slits extending back into the elements from the edges thereof nearest the edges of the portions to be welded, said slits being located at regions along the mid-portions of the edges which are to be welded, said slits at their inner ends terminating in apertures.

12. Heating apparatus for use in welding an elongated edge of one metal member to an elongated edge of another metal member comprising in combination: means for clamping said members respectively in positions with their said edges extending along each other in closely-spaced relation; means for conducting heating current from a source having a frequency of the order of 100,000 cycles per second or higher to flow along one of said edges and thence back along the other; and a non-magnetic member of high electrical conductivity extending along and close to the space between said edges and spaced therefrom for decreasing the impedance to the flow of said current on said edges and thereby to increase the degree of concentration of such current flow on said edges.

13. Heating apparatus for use in welding an elongated edge of one metal member to an elongated edge of another metal member comprising in combination: means for clamping said members respectively in positions with their said edges extending along each other in closely-spaced relation; means for conducting heating current from a source having a frequency of the order of 100,000 cycles per second or higher to flow along one of said edges and thence back along the other, said conducting means including conductive elements respectively positioned in contact with said members and extending along close to the edges thereof; and a non-magnetic member of high electrical conductivity extending along and close to the space between said edges and spaced therefrom for decreasing the impedance to the flow of said current on said edges and thereby to increase the degree of concentration of such current flow on said edges.

References Cited in the file of this patent

UNITED STATES PATENTS

| 2,066,668 | Bennett | Jan. 5, 1937 |
| 2,172,080 | Fay et al. | Sept. 5, 1939 |

UNITED STATES PATENT OFFICE

CERTIFICATE OF CORRECTION

Patent No. 2,919,342　　　　　　　　　　　December 29, 1959

Fred Kohler et al.

It is hereby certified that error appears in the above numbered patent requiring correction and that the said Letters Patent should read as corrected below.

In the grant, line 1, and in the heading to the printed specification, line 3, name of co-inventor, for "Walter C. Rudd" read -- Wallace C. Rudd --.

Signed and sealed this 28th day of June 1960.

(SEAL)
Attest:

KARL H. AXLINE
Attesting Officer

ROBERT C. WATSON
Commissioner of Patents